(12) United States Patent
Lin et al.

(10) Patent No.: US 8,845,207 B2
(45) Date of Patent: Sep. 30, 2014

(54) OPTICAL FIBER CONNECTOR AND ADAPTER CAPABLE OF PREVENTING DUST

(75) Inventors: Sung An Lin, Miaoli County (TW); Sung Chi Lin, Miaoli County (TW)

(73) Assignee: Protai Photonic Co., Ltd., New Taipei (TW)

(*) Notice: Subject to any disclaimer, the term of this patent is extended or adjusted under 35 U.S.C. 154(b) by 958 days.

(21) Appl. No.: 12/911,794

(22) Filed: Oct. 26, 2010

(65) Prior Publication Data

US 2012/0057825 A1 Mar. 8, 2012

(30) Foreign Application Priority Data

Sep. 3, 2010 (TW) .............................. 99129833 A

(51) Int. Cl.
*G02B 6/00* (2006.01)
*G02B 6/36* (2006.01)

(52) U.S. Cl.
USPC ............................................ 385/78; 385/139

(58) Field of Classification Search
USPC ................ 385/51, 53, 55, 57, 59, 88–90, 147
See application file for complete search history.

(56) References Cited

U.S. PATENT DOCUMENTS

| | | | |
|---|---|---|---|
| 4,744,621 A * | 5/1988 | Tanabe et al. .................... | 385/84 |
| 5,317,663 A | 5/1994 | Beard et al. | |
| 5,658,159 A | 8/1997 | Gardner et al. | |
| 6,142,676 A | 11/2000 | Lu | |
| 6,142,677 A | 11/2000 | Sato | |
| 6,179,478 B1 | 1/2001 | Shouji et al. | |
| 6,428,215 B1 * | 8/2002 | Nault ............................... | 385/78 |
| 6,695,489 B2 * | 2/2004 | Nault ............................... | 385/78 |
| 6,712,523 B2 * | 3/2004 | Zimmel ........................... | 385/72 |
| 6,962,445 B2 * | 11/2005 | Zimmel et al. ................... | 385/55 |
| 7,542,732 B2 | 6/2009 | Ka | |
| 8,632,259 B2 * | 1/2014 | Shen et al. ........................ | 385/81 |
| 2002/0061170 A1 | 5/2002 | Wu | |
| 2003/0031422 A1 | 2/2003 | Inagaki | |
| 2009/0060422 A1 | 3/2009 | Lin | |
| 2012/0057825 A1 * | 3/2012 | Lin et al. .......................... | 385/78 |
| 2012/0057827 A1 * | 3/2012 | Chang ............................ | 385/78 |

FOREIGN PATENT DOCUMENTS

| | | |
|---|---|---|
| CN | 101067674 A | 11/2007 |
| DE | 20308264 U1 | 8/2003 |
| JP | 1995023304 U | 4/1995 |
| JP | 2003057491 A | 2/2003 |
| JP | 2005326523 A | 11/2005 |
| TW | 200909896 A | 3/2009 |

* cited by examiner

*Primary Examiner* — Akm Enayet Ullah
(74) *Attorney, Agent, or Firm* — Lowe Hauptman & Ham, LLP

(57) ABSTRACT

An optical fiber adapter includes a housing, a hook member and an elastic body. The housing has an axial cavity defined by a first wall, a second wall, a third wall and a fourth wall. The hook member is positioned in the axial cavity which comprises a flange, a hollow cylinder and a pair of hooks. The hollow cylinder and hooks extends from one end of the flange and the hollow cylinder is positioned between the hooks. The elastic body is positioned on and around the hollow cylinder. When the optical fiber connector is inserted into the axial cavity of the optical fiber adapter, the ferrule will be inserted into the hollow cylinder and the elastic body will be in contact with inner walls of the inner housing of the optical fiber connector.

3 Claims, 2 Drawing Sheets

OPTICAL FIBER CONNECTOR AND ADAPTER CAPABLE OF PREVENTING DUST

CROSS REFERENCE TO RELATED APPLICATION

This application claims the priority benefit of Taiwan Patent Application Serial Number 099129833 filed Sep. 3, 2010, the full disclosure of which is incorporated herein by reference.

BACKGROUND OF THE INVENTION

1. Field of the Invention

The present invention relates to an optical fiber adapter, and more particularly, to an optical fiber adapter capable of preventing dust.

2. Description of the Related Art

Fiber optics has revolutionized communication throughout the world. With the increased used of fiber optics it has become increasingly important to be able to connect and disconnect fiber optic cables from various sources. Two fiber optic cables can be optically coupled so that they are in communication with each other by using connectors and an adapter, thereby putting each fiber optic cable in communication with the other. The connectors are placed on the end of each cable and then plugged into the adapter. The adapter has two openings each one designed to receive a connector.

However, when an optical fiber connector is inserted into an optical fiber adapter, a narrow channel will be present between the connector and the inner walls of the adapter. Thus, external dust can still pass through this narrow space to contaminate the ferrule of the connector.

Accordingly, there exists a need to provide a solution to solve the aforesaid problems.

SUMMARY OF THE INVENTION

The present invention provides an optical fiber adapter capable of preventing dust from contaminating the ferrule of an optical fiber connector when the optical fiber connector is inserted into the optical fiber adapter.

In one embodiment, the optical fiber adapter of the present invention includes a housing, a hook member and an elastic body. The housing has an axial cavity defined by a first wall, a second wall, a third wall and a fourth wall. The hook member is positioned in the axial cavity which comprises a flange, a hollow cylinder and a pair of hooks. The hollow cylinder and hooks extends from one end of the flange and the hollow cylinder is positioned between the hooks. The elastic body is positioned on and around the hollow cylinder. When the optical fiber connector is inserted into the axial cavity of the optical fiber adapter, the ferrule will be inserted into the hollow cylinder and the elastic body will be in contact with inner walls of the inner housing of the optical fiber connector.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 1:
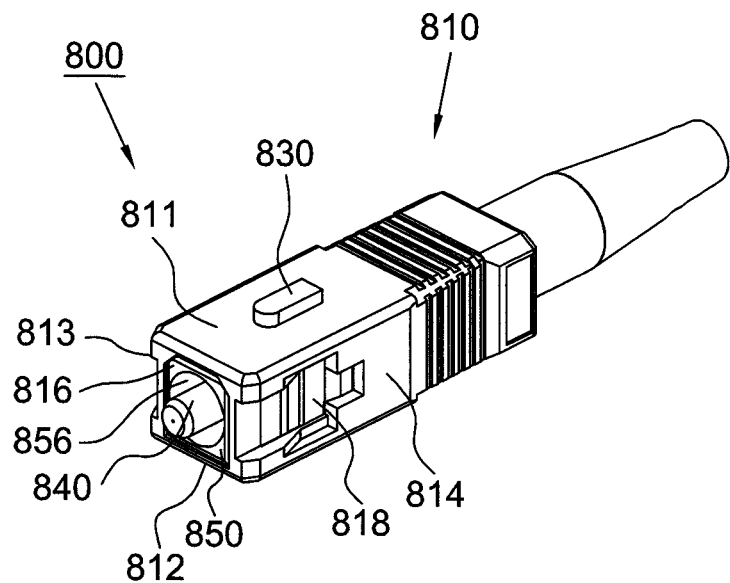
FIG. 1 is an elevated perspective view of a conventional SC type optical fiber connector.

Referring to FIG. 1, a conventional SC type optical fiber connector 800 has a generally rectangular shape with a square cross section. The connector 800 includes a rectangular hollow outer housing 810 comprised of a top side-wall 811, a bottom side-wall 812, a right side-wall 813 and a left side-wall 814, wherein the right side-wall 813 is opposite to the left side-wall 814 and connects with the bottom side-wall 812 and the top side-wall 811. A protrusion 830 is formed on the top side-wall 811 and a through opening 818 is formed on each of the left and right side-walls 814, 813. A hollow inner housing 850 is placed in the outer housing 810 that can move back and forth through a rectangular opening 816 on the front end of the outer housing 810. In addition, a ferrule 840 is placed in the inner housing 850 and protrudes from a circular opening 856 on the front end of the inner housing 850 and from the opening 816 on the outer housing 810. A spring is located inside the inner housing 850 to allow the ferrule 840 to move back and forth through the openings 816, 856 (not shown in the figure).

Figure 2:
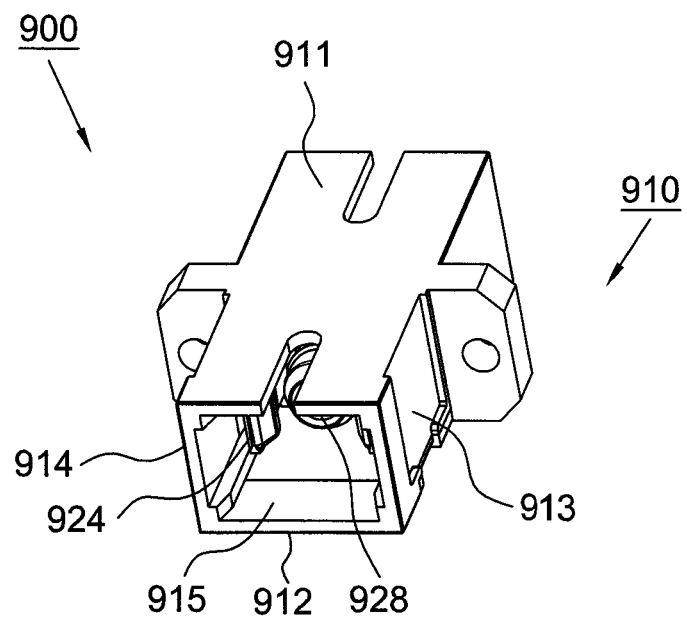
FIG. 2 is an elevated perspective view of the optical fiber adapter according to the present invention.
Figure 3:
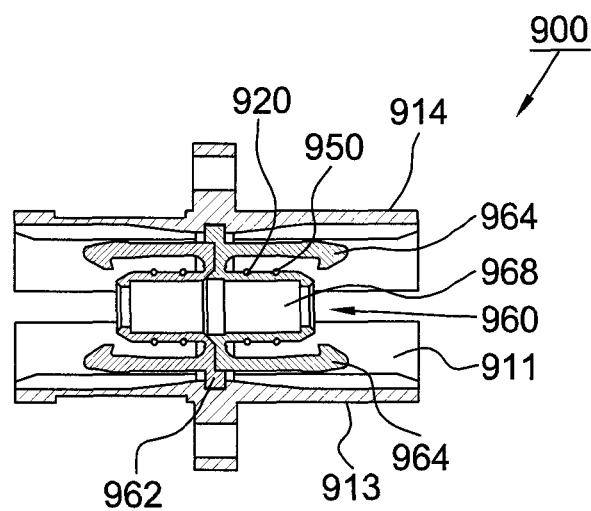
FIG. 3 is a cross-sectional view of the optical fiber adapter according to the present invention.

Referring to FIGS. 2 and 3, the optical fiber adapter 900 according to the present invention includes a generally rectangular housing 910. The housing 910 has an axial cavity 915 defined by a top side-wall 911, a bottom side-wall 912, a right side-wall 913 and a left side-wall 914. A pair of hook members 960 is located inside the axial cavity 915. Each the hook member 960 is provided with a pair of hooks 964 extending from one end of a generally rectangular flange 962. Each the flange 962 includes a hollow cylinder 968 located between the two hooks 964. In addition, at least one annular indentation 920 is formed on the outer walls of the hollow cylinder 968. At least one annular elastic body 950 is located in the indentation 920. Specifically, the elastic body 950 is placed on and around the outer walls of the hollow cylinder 968.

Figure 4:
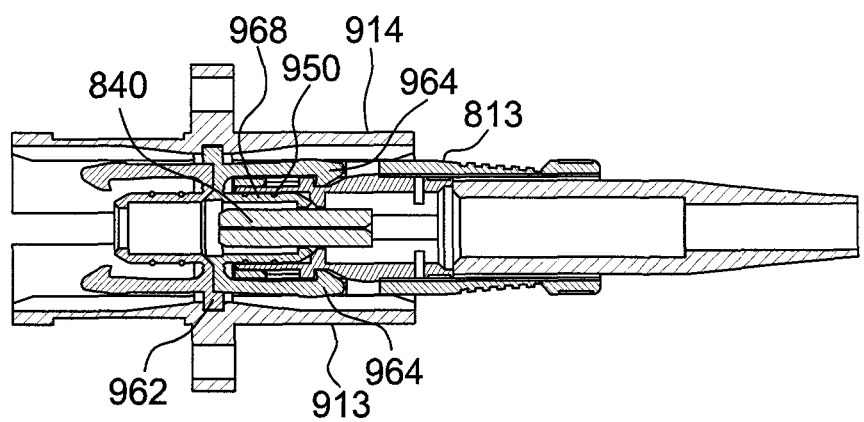
FIG. 4 is a cross-sectional view illustrating that the optical fiber connector of FIG. 1 is inserted into the optical fiber adapter of FIG. 2.

Referring to FIG. 4, when the connector 800 is fully inserted into the adapter 900 of the present invention, the hollow cylinder 968 of the adapter 900 will be inserted into the inner housing 850 of the connector 800 through the opening 856 and the ferrule 840 of the connector 800 will be inserted into the hollow cylinder 968 of the adapter 900. Furthermore, the two hooks 964 will hook to the outer walls of the inner housing 850 through the openings 818 on the left and right side-walls 814, 813, respectively. The annular elastic body 950 positioned on the hollow cylinder 968 of the adapter 900 will be brought into tight contact with the inner walls of the inner housing 850 of the connector 800. In this way external dust will fail to enter the hollow cylinder 968 to contaminate the ferrule 840 received in the hollow cylinder 968 due to the obstruction of the elastic body 950 when the connector 800 is fully inserted into the adapter 900.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An optical fiber adapter configured to receive an optical fiber connector, wherein the optical fiber connector has an outer housing, an inner housing and a ferrule, the outer housing has an opening formed thereon, the inner housing has an opening formed thereon and is positioned in the outer housing, the ferrule is positioned in the inner housing and protrudes from the openings of the inner and outer housings, the optical fiber adapter comprises:

a housing having an axial cavity defined by a first wall, a second wall, a third wall and a fourth wall;

a hook member positioned in the axial cavity, comprising a flange, a hollow cylinder and a pair of hooks; the hollow cylinder and hooks extending from one end of the flange, the hollow cylinder being positioned between the hooks; and an elastic body positioned on and around the hollow cylinder; and wherein when the optical fiber connector is inserted into the axial cavity of the optical fiber adapter, the ferrule will be inserted into the hollow cylinder and the elastic body will be in contact with inner walls of the inner housing of the optical fiber connector.

2. The optical fiber adapter as claimed in claim 1, wherein the hollow cylinder has an indentation formed thereon, and the elastic body is positioned in the indentation.

3. The optical fiber adapter as claimed in claim 1, wherein the optical fiber adapter is an SC type optical fiber adapter.

* * * * *